(No Model.)
D. B. HANSON.
OFFSETTING SAWMILL CARRIAGE.
No. 533,124. Patented Jan. 29, 1895.
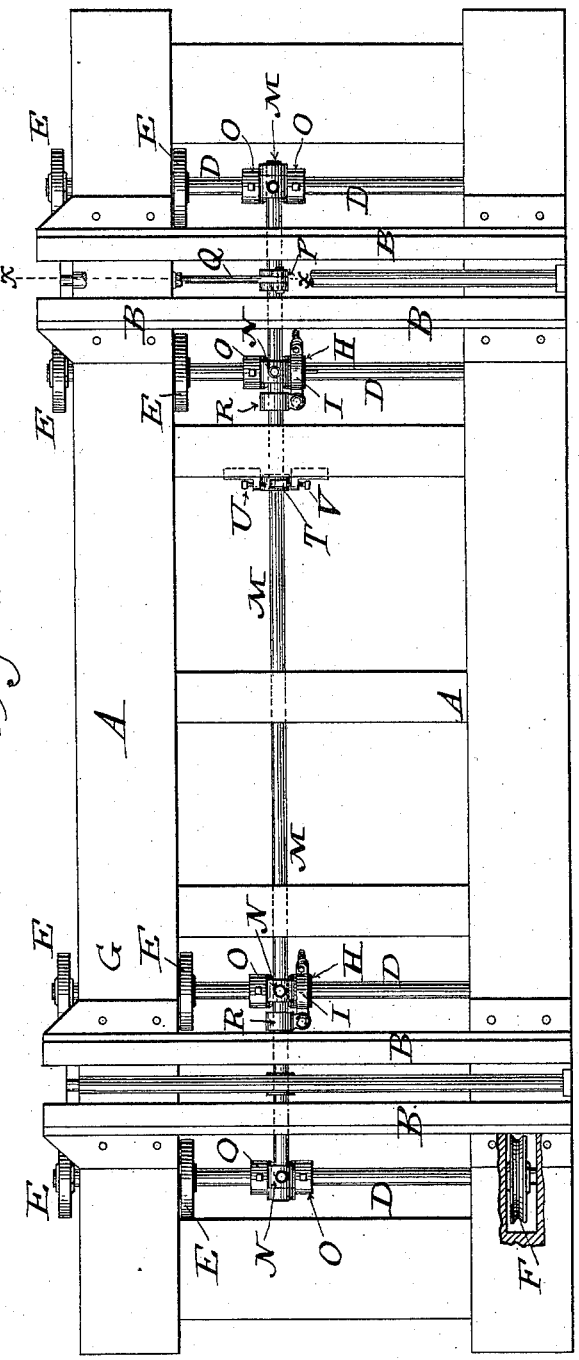
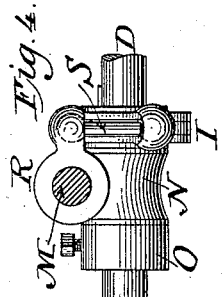
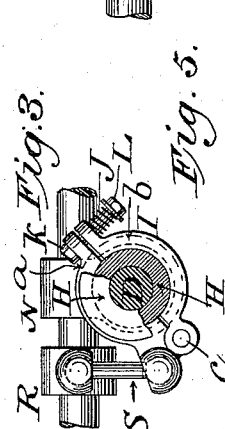
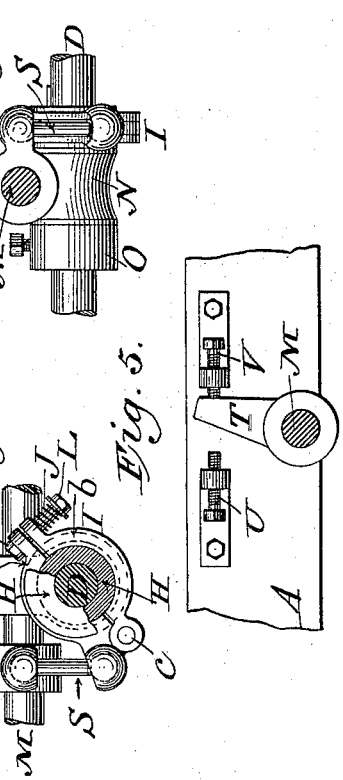
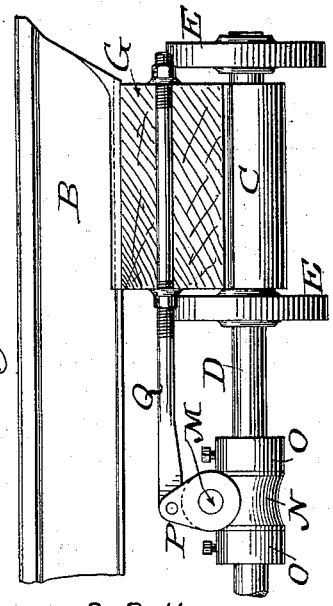
Witnesses
Sidney P. Hollingsworth
C. C. Burdine
D. B. Hanson
Inventor,
by his attorneys
Dodge & Sons.

UNITED STATES PATENT OFFICE.

DEMPSEY B. HANSON, OF SAN FRANCISCO, CALIFORNIA, ASSIGNOR OF ONE-HALF TO THE EDWARD P. ALLIS COMPANY, OF MILWAUKEE, WISCONSIN.

OFFSETTING SAWMILL-CARRIAGE.

SPECIFICATION forming part of Letters Patent No. 533,124, dated January 29, 1895.

Application filed October 12, 1894. Serial No. 525,694. (No model.)

*To all whom it may concern:*

Be it known that I, DEMPSEY B. HANSON, a citizen of the United States, residing at San Francisco, in the county of San Francisco and State of California, have invented certain new and useful Improvements in Offsetting Sawmill-Carriages, of which the following is a specification.

My invention relates to automatic offsetting mechanism for saw mill carriages, and consists in certain novel features and details of construction hereinafter set forth.

In the accompanying drawings,—Figure 1 is a top plan view of a saw mill carriage embodying my invention; Fig. 2, a vertical section on the line $x$—$x$ of Fig. 1; and Figs. 3, 4 and 5 views illustrating details hereinafter explained.

The purpose of my invention is to simplify and cheapen the construction of offsetting mechanism for saw mill carriages while rendering its action prompt and certain.

To this end it consists in the construction represented in the drawings and which will now be explained in detail with the aid of said drawings.

A indicates the log frame composed of strong timbers suitably framed together, and upon the upper face of which are secured head blocks B, in or along which slide the usual knees. This frame is provided on its under side with suitable boxes C, through which extend truck axles D provided with bearing wheels E and F.

Where very heavy logs are to be handled it is found desirable to provide two sets of truck wheels E at the inner or saw side of the log frame, as shown in Figs. 1 and 2, said wheels being flat-faced, while the wheels F are grooved to fit upon the guiding rail in the usual manner.

The boxes are free to slide along the axles D a limited distance, and the wheels E are accordingly set at a distance apart enough greater than the length of the boxes to permit this play. So too, the sills or timbers G, which are mortised or recessed to permit the wheels F to enter their under faces, have these recesses made of sufficient width to permit the play of the frame upon the axles without impedance. The wheels E and F are all firmly secured upon the axles in order that they may maintain their proper positions upon the track rails under all circumstances.

For the purpose of shifting the frame laterally or in the direction of the length of the axles D, there is secured upon one or more of said axles, usually two in practice, a friction hub or disk H, which is circumferentially grooved to receive a two-part friction band I. As shown in Fig. 3, this friction band comprises two semicircular or nearly semicircular parts $a$ and $b$, connected at one end by a hinge joint $c$, and pressed together at the opposite end by a strong spiral spring J encircling a bolt K which passes through eyes in the ends of the band sections as shown in Fig. 3. The bolt K is provided with a nut L, which may be turned to compress the spring J more or less according to the pressure and friction desired.

M indicates a shaft extending lengthwise of the frame A and journaled in bearings formed in sleeves N mounted upon and encircling the axles, and held against movement in the direction of the length of said axles by collars O, secured firmly in place by set screws or other fastenings, as indicated in Figs. 1, 2 and 4. By this arrangement the axles are caused to support the sleeves N, yet are permitted to rotate freely within them.

Secured upon the shaft at suitable points are crank arms P, Figs. 1 and 2, from each of which a stout iron rod or bolt Q passes to and through one of the longitudinal sills or timbers of the log frame A, as indicated in Fig. 1 and more clearly shown in Fig. 2, the rod Q being screw-threaded and provided with nuts at the inner and outer faces of the log frame, sill or timber, which may be adjusted to bring the frame and the crank arm P into any desired relation. This provision is important in that it enables me to set either end of the carriage slightly forward or backward and to make nice adjustment of the log frame relatively to the trucks in assembling the parts f the structure, thereby insuring coincident movement of the two ends of said frame. Without such provision it would be difficult to make accurate initial adjustment of parts, and the log would be presented to the saw obliquely. Also made fast to the shaft at suitable points, and close to the respective friction bands I of the axles D, are collars R, from each of which a connecting rod S extends to one of the friction bands I, the ends of said connecting rod being connected with the collars R and with the friction bands I by a ball and socket joint, as shown in Figs. 3 and 4, or by similar universal joints.

The collars R and the bands I are each made with eccentric or radial portions in the nature of crank arms, for the purpose of receiving the ends of connecting rods S, and giving the leverage necessary for proper friction of the parts.

T, Figs. 1 and 5, indicates an arm projecting radially from a sleeve keyed or otherwise made fast to the shaft M at a point near one of the cross timbers of the frame A, and arranged to play between two adjustable stops U and V, which, as represented in Figs. 1 and 5, may be conveniently made in the form of screws or bolts passing through metallic blocks secured to said timber. By adjusting these screws or bolts, the play of the arm T, and consequently the extent of oscillation of shaft M, may be regulated as desired.

The parts being thus constructed and properly adjusted, the operation is as follows: Power being applied in any usual manner to move the carriage A in the direction of its length or along its track, will cause the truck wheels and axles to rotate, and will of course effect a rotation of the friction collars H secured firmly upon said axles. The friction bands I bearing firmly upon the friction collars, will turn with the axles, and through the medium of connecting rods S, will turn the collars R and the shaft M to which said collars are secured. In thus turning, the shaft M will carry with it the crank arms P, which, through the medium of rods Q, will move the log frame lengthwise of the axle until the arm T comes in contact with one of the stops U or V. The shaft M being thus prevented from rotating further, will of course prevent further rotation of the friction bands I with the collars or hubs which they encircle, and the further movement of the carriage will then simply cause the hubs or collars H to rotate within said bands until the carriage comes to rest, or its motion is reversed. Upon reversal of the travel of the carriage the friction bands will of course partake of the motion of the axles and turn in the direction opposite to that in which they previously turned. As a consequence, the shaft M will be turned backward, or in a direction opposite to that in which it previously turned, and the log frame will be slid upon the axles in a direction opposite to that in which it previously moved.

It is of course understood that the carriage is moved inward or toward the saw at the commencement of the forward or cutting travel, and is receded preparatory to returning or "gigging back."

I am aware that it is not broadly new to shift a log frame through the action of a friction device encircling a hub on the axle of the carriage, and I do not therefore broadly claim this idea.

Having thus described my invention, what I claim is—

1. In combination with log frame A and truck axle D, friction hub or collar H secured upon said axle; friction band I encircling said collar; shaft M provided with crank arm P and collar R; rod S connecting the friction band and collar R, and rod Q connecting crank P with frame A.

2. In combination with the supporting axles, trucks, and log frame of a saw mill carriage, friction devices carried by the axles; a shaft extending lengthwise of the log frame and provided with crank arms; rods connecting said crank arms with the log frame; and universal couplings or joints connecting the friction devices of the axles with the longitudinal shaft, substantially as set forth.

3. In combination with axles D and frame A, collars H secured to said axles; friction devices I composed of hinged members $a$ and $b$, bolt K, spring J, and nut L; oscillating shaft M extending lengthwise of the log frame and provided with collars R; connecting rods S, extending from the friction devices to the collars R; crank arms P carried by the shaft M, and rods Q connecting the crank arms P with the frame A.

In witness whereof I hereunto set my hand in the presence of two witnesses.

DEMPSEY B. HANSON.

Witnesses:
JOHN WALLACE,
JOHN F. BERNARD.